350-345 SR
9/9/80 XR 4,221,112

United States Patent [19]
Enomoto et al.

[11] 4,221,112
[45] Sep. 9, 1980

[54] ELECTRONIC WATCH WITH ILLUMINATION DEVICE

[75] Inventors: Tadao Enomoto, Higashimurayama; Hiroshi Koide, Tokyo; Nobuo Ito, Tokyo; Hidefumi Kasai, Tokyo; Tsutomu Noguchi, Higashimurayama, all of Japan

[73] Assignee: Citizen Watch Company Limited, Tokyo, Japan

[21] Appl. No.: 960,340

[22] Filed: Nov. 13, 1978

[30] Foreign Application Priority Data

| | | | |
|---|---|---|---|
| Nov. 16, 1977 | [JP] | Japan | 52/136734 |
| Dec. 23, 1977 | [JP] | Japan | 52/173565[U] |
| Dec. 23, 1977 | [JP] | Japan | 52/173566[U] |
| Dec. 23, 1977 | [JP] | Japan | 52/173567[U] |
| Feb. 25, 1978 | [JP] | Japan | 53/023761[U] |
| Apr. 27, 1978 | [JP] | Japan | 53/056494[U] |

[51] Int. Cl.[3] .......................... G04B 19/30; F21K 2/00; G02F 1/13

[52] U.S. Cl. .......................................... 368/84; 250/463; 350/345

[58] Field of Search .................. 58/14 A, 23 R, 50 R, 58/50 A, 127 R; 250/462, 463; 350/337, 338, 345; 313/483; 362/23, 26, 29

[56] References Cited

U.S. PATENT DOCUMENTS

| | | | |
|---|---|---|---|
| 3,950,078 | 4/1976 | Zatsky | 350/345 |
| 4,126,384 | 11/1978 | Goodman | 350/345 |
| 4,142,287 | 3/1979 | Grabbe | 58/88 |

*Primary Examiner*—Edith S. Jackmon
*Attorney, Agent, or Firm*—Jordan & Hamburg

[57] ABSTRACT

An electronic watch construction which comprises a casing, a watch glass supported by the casing, a module fixedly held in the casing and having a recess facing the watch glass, and a liquid crystal display cell at least a portion of which is disposed in the recess of the module, the display cell being fixedly mounted on one side of the module. An illumination device is disposed in the recess of the module below the liquid crystal display cell to illuminate the liquid crystal display cell.

16 Claims, 28 Drawing Figures

Fig. 25
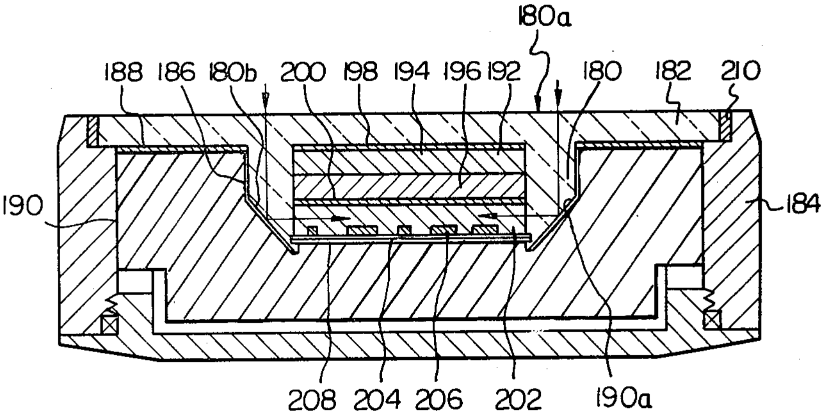
Fig. 26
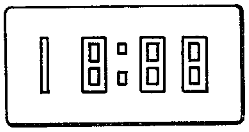
Fig. 28
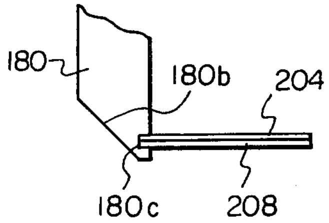
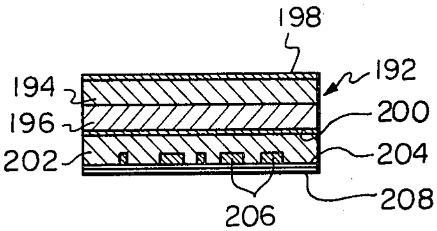
Fig. 27

ELECTRONIC WATCH WITH ILLUMINATION DEVICE

This invention relates to an illumination device for a liquid crystal display type timepiece wherein time and other information displayed by the timepiece is illuminated through the use of a light-emitting paint.

While a large number of devices for illuminating a timepiece display are known in the art, a device which employs a small lamp is most typical. An illumination device of this type has long been employed in mechanical timepieces and is now being used in electronic timepieces of the liquid crystal display type. Since illumination devices which rely on lamps naturally operate on electric power obtained from the battery of the timepiece, it is not permissible to energize such a lamp constantly in view of the power which would be consumed. The lamp is therefore energized only when necessary by means of push button.

It is therefore an object of the present invention to provide an illumination device which overcomes the inconvenience encountered in the prior art in which a power source was necessary for operating an illumination device which employed a small lamp.

It is another object of the present invention to provide an illumination device which produces maximum illumination of a time display with a minimum amount of radioactivity without the need of a power source, wherein the boundary between a light-emitting paint and a side sealing member is not conspicuous.

It is still another object of the present invention to provide an illumination device which enables the time indicated by a liquid crystal display to be easily read in daylight.

Other objects, features and advantages of the present invention will become apparent from the following detailed description when taken in conjunction with the accompanying drawings, in which:

In the accompanying drawings, in which:

FIG. 25 is a cross-sectional view of a modification of the illumination device of FIG. 20 as installed in a wristwatch;

FIG. 26 is a front view of a display device shown in FIG. 25;

FIG. 27 is a cross-sectional view showing the display device of FIG. 26 jointed to an illumination portion; and FIG. 28 is an enlarged view of a portion of FIG. 25.

Figure 1:
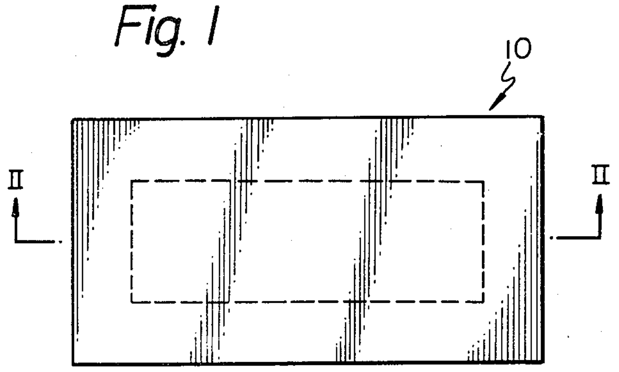
FIG. 1 is a plan view of an illumination device according to the present invention.
Figure 2:
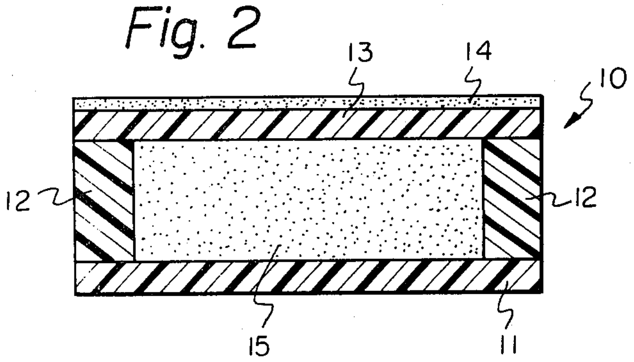
FIG. 2 is a cross-sectional view taken along the line II—II of FIG. 1.
Figure 3:
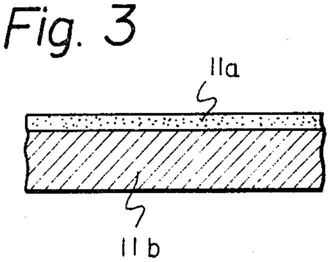
FIG. 3 is a cross-sectional view of a modification of a top sealing member.

Referring now to FIGS. 1 and 2 which illustrate the illumination device of the present invention, reference numeral 10 denotes the illumination device and 11 a back sealing member that covers the back portion of the device and which comprises a layer of white vinyl chloride that enhances humidity resistance and reflectivity. A pair of side sealing members 12 for covering the sides of the device consist of a layer of a light-storing paint, such as ZnS, or synthetic resin, and a top sealing member 13 for covering the upper portion of the device comprises a layer of a transparent polyester resin or ethylene trifluoride resin the top side of which is provided with a white, light-storing painted layer 14 having excellent reflectivity. A layer 15 of light-emitting paint which is a composition of 147 Pm, ZnS and Cu is disposed in the space defined by the back sealing member 11, side sealing members 12 and top sealing member 13. The light-emitting paint layer 15 is applied to a thickness of 200$\mu$. As an alternative to vinyl chloride to form back sealing member 11, a metal plate 11*b* whose top surface is provided with a layer of titanium white paint 11*a* can be employed, as shown in FIG. 3.

A bonding agent or the like is used to bond and seal back sealing member 11 and side sealing members 12 together as well as the side sealing members 12 and top sealing member 13. This seals off light-emitting paint layer 15 from the outside and maintains humidity resistance. The light emitted from the light-emitting paint layer is reflected by back sealing member 11 and is projected upwardly in an extremely effective manner.

Figure 4:
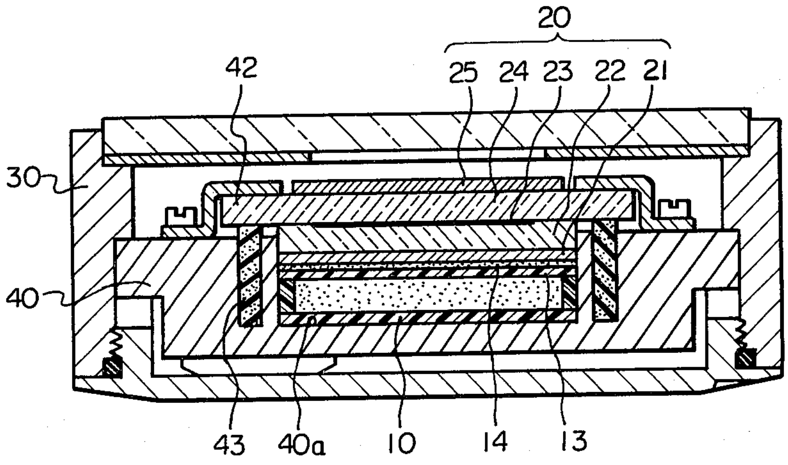
FIG. 4 is a cross-sectional view of the illumination device according to the present invention as it is applied to a liquid crystal timepiece.
Figure 5:
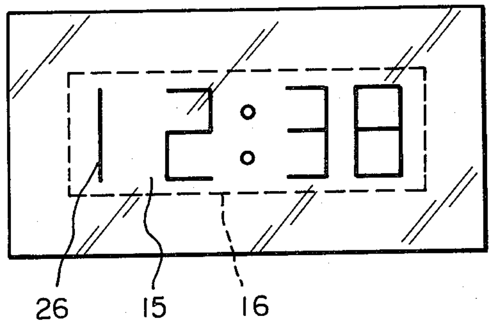
FIG. 5 is a plan view of the time display portion of the liquid crystal timepiece.

FIGS. 4 and 5 illustrate a preferred embodiment of a timepiece construction incorporating the illumination device according to the present invention. A module 40 which incorporates such elements as an oscillator circuit section, circuitry and a battery is shown disposed in a watch case 30 which also accommodates a liquid crystal display device 20. The illumination device 10 is disposed in a recessed portion 40*a* of module 40 and is topped by the liquid crystal display device 20 which comprises a lower polarizing plate 21, lower glass plate 22, liquid crystal layer 23, upper glass plate 24 and upper polarizing plate 25. Both the illumination device 10 and liquid crystal display device 20 are secured to module 40 by a restraining frame 42. Electric signals from module 40 are transmitted to liquid crystal display device 10 by electrically conductive rubber 43.

Illumination device 10 is positioned below liquid crystal display device 20 and constantly illuminates the time which is displayed by the liquid crystal display segments. During the daytime outside light is reflected by the white painted surface 14 disposed on the top surface of top sealing member 13 and excites the surface 14 which exhibits a light-storing property as mentioned above. The time is therefore displayed in a bright and brilliant manner. Furthermore the boundary 16 between light-emitting paint layer 15 and side sealing member 12 is not conspicuous as it is lightly covered by the white paint layer 14 which is used instead of a reflecting plate. At night or in a darkened area the light emitted from light-emitting paint layer 15 is transmitted through top sealing member 13 and then passes through and excites the white light-storing paint layer 14 to illuminate the display segments. An extremely small amount of light-emitting paint 15 produces illumination at maximum efficiency since the paint is disposed directly below the display segments 26 as FIG. 5 shows.

In accordance with the present invention as described above, a light-emitting paint is safely sealed in an air-tight manner so as not to harm the human body, and a sealing member having a high degree of reflectivity is disposed below the light-emitting paint to enhance the illumination efficiency. The overall appearance of the illumination device is enhanced further by covering the boundary between the light-emitting paint and the side sealing member with the top sealing member having a light-storing layer of paint. The present invention is also extremely practical if applied to a liquid crystal type timepiece since the illumination device permits the liquid crystal display to be read at all times even in the dark. The illumination device of the present invention, unlike the conventional device which relied upon a lamp, consumes no electric power so that it is possible to utilize low power batteries which are extremely small and thin, thus allowing a further reduction in the thickness of the module and timepiece case. If conventional batteries are used their lifetime can be extended. Costs can be lowered considerably by doing away with extra push buttons, lamps and associated circuitry and by eliminating the machining steps that would be necessary for producing the push button holes. Moreover, in daylight the time can be read just as easily as in conventional timepieces while there is no conspicuous boundary between the light-emitting paint and side sealing member.

Figure 6:
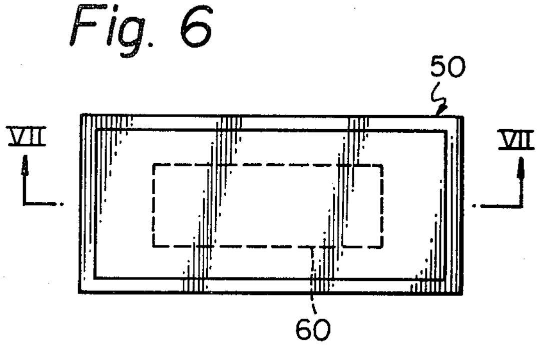
FIG. 6 is a plan view of another preferred embodiment of an illumination device according to the present invention.
Figure 7:
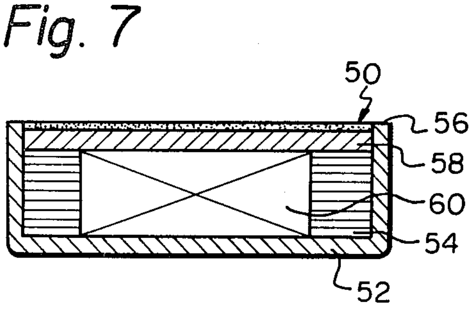
FIG. 7 is a cross-sectional view taken along the line VII—VII of FIG. 6.

FIGS. 6 and 7 illustrate another preferred embodiment of the illumination device of the present invention. Reference numeral 50 denotes the illumination device which comprises a sealing member 52 in the form of a cup that covers the back and side portions of the device. The sealing member 52 consists of white vinyl chloride that enhances humidity resistance, illuminating effect and reflectivity. Side sealing members 54 for covering side portions of the device consists of a light-storing paint or synthetic resin. This arrangement brightly illuminates the display owing to the multiplying effect of the light-emitting paint and light-storing paint. A top sealing member 58 for covering the upper portion of the device consists of a transparent polyester resin or ethylene trifluoride resin the top side of which is coated with a white, light-storing painted layer 56 having excellent reflectivity. A light-emitting paint layer 60 which is a composition of 147 Pm, ZnS and Cu is disposed in the space defined by the back sealing member 52, side sealing members 54 and top sealing member 58. These sealing members are joined together and sealed by thermocompression bonding.

Figure 8:
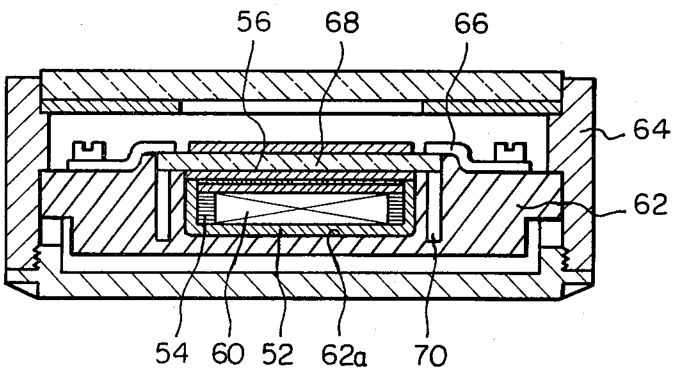
FIG. 8 is a cross-sectional view showing the illumination device of FIG. 7 as installed in a wristwatch.

FIG. 8 illustrates an example in which the illumination device shown in FIG. 7 is applied in a timepiece having a liquid crystal display. A module 62 which incorporates such elements as an oscillation section, circuitry and a battery is shown disposed in a watch case 64. The illumination device 50 is fitted into a recessed portion 62*a* of the module and is secured thereto by a restraining frame 66 which presses down the liquid crystal cell portion of the display device 68. Electric signals from module 62 are transmitted to the liquid crystal display device by electrically conductive rubber 70.

Illumination device 50 is in direct contact with the bottom side of liquid crystal display device 68 and constantly illuminates the entire surface of liquid crystal display portion 68. During the daytime ambient light is reflected by the white, light-storing paint 56 disposed on the top surface of illumination device 50 and also serves to excite the light-storing paint, thereby allowing the time information to be displayed in a bright, clear manner. Since the light-emitting paint layer 60 and side sealing members 54 are different in color, it would be possible to distinguish between them if they were left uncovered and viewed from above. As this is not a desirable condition, the paint and the side sealing member are thinly covered by the white, light-storing paint layer 56 so that the difference in color is not conspicuous. At night the light from the light-emitting paint passes through the stacked display arrangement to illuminate the time display device 68. At this time a bright and clear display of time information can be obtained since the time display device 68 is efficiently illuminated owing to the white vinyl chloride back sealing member 52 which effectively reflects the light from light-emitting paint layer 60 and the side sealing members 54 consisting of light-storing paint and prevents this light from leaking from the sides of the device 50.

In the embodiment of FIGS. 6 to 8, the white, vinyl chloride back sealing member 52 is an integrally formed, cup-shaped package that covers the back and side portions of the illumination device. This improves the reflection of light from the light-emitting paint layer 60 and light storing sealing members 54 and also eliminates loss of this light, thereby making it possible to obtain a brighter, clearer and more attractive time display at night than was the case in the prior art. Moreover, the fact that the light-emitting paint layer 60 is introduced into the cup-shaped vinyl chloride resin package during the sealing operation greatly simplifies handling and thus improves workability and efficiency.

Figure 9:
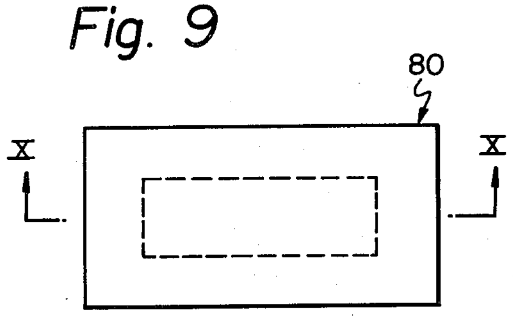
FIG. 9 is a front view of a modification of the illumination device shown in FIG. 7.
Figure 10:
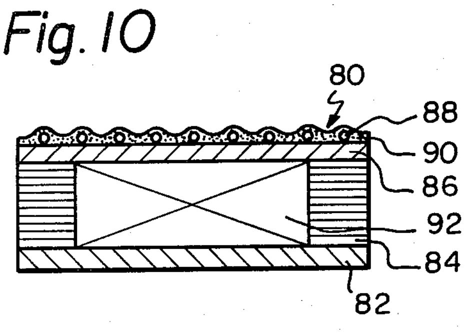
FIG. 10 is a cross-sectional view taken along the line X—X of FIG. 9.

FIGS. 9 and 10 illustrate a modification of the illumination device shown in FIGS. 6 and 7. Reference numeral 80 denotes the illumination device which comprises a back sealing member 82 that covers the back portion of the device and consists of white vinyl chloride that enhances humidity resistance and reflectivity. Side sealing members 84 for covering the sides of the device consists of a light-storing paint or synthetic resin, and a top sealing member 86 for covering the upper portion of the device consists of a transparent polyester resin or ethylene trifluoride resin to the top side of which glass beads or transparent resin beads 88 are fixed by a white, light-storing paint 90 having a high degree of reflectivity. The glass beads 88 are applied to a thickness of approximately 20μ. A light-emitting paint layer 92 which is a composition of 147 Pm, ZnS and Cu is disposed in the space defined by the back sealing member 82, side sealing members 84 and top sealing member 86. The sealing members 82, 84 and 86 are joined together and sealed by thermocompression bonding.

Figure 11:
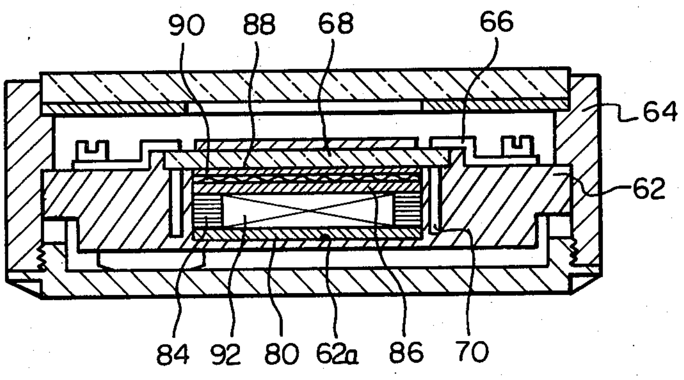
FIG. 11 is a cross-sectional view of the illumination device of FIG. 10 as installed in a wristwatch.

FIG. 11 shows a timepiece construction in cross section, with like parts bearing the same reference numerals as those used in FIG. 8. Illumination device 80 is in direct contact with the bottom side of liquid crystal display device 68 and constantly illuminates the entire surface of liquid crystal display device 68. During the daytime the ambient light is irregularly reflected by the white, light-storing paint 90 on the glass beads 88 which have been provided on the top surface of the illumination device 80, and the light also serves to excite the light-storing paint 90 thereby allowing the time information to be displayed in a bright, clear manner. Since the light-emitting paint layer 92 and side sealing members 84 are different in color, it would be possible to distinguish between them if they were left uncovered and viewed from above. This is not a desirable condition. However, the light from the light-emitting paint layer 92 is irregularly reflected by the glass beads 88 on the top surface of the top sealing member 86 so that the entire surface of the liquid crystal display device 68 is uniformly illuminated in an extremely effective manner. This provides a bright, clear display which makes it impossible to distinguish between the light-emitting paint and side sealing members. At night the light from the light-emitting paint layer 92 excites the white, light-storing paint 90 through the glass beads 88, making it possible to obtain a brighter time display than was the case in the prior art.

In the modification of FIGS. 9, 10 and 11, glass beads 88 are fixed to the top surface of the top sealing member 86 of the illumination device 80 by the white, light-storing paint 90 so that in the daytime ambient light is irregularly reflected by the light-storing paint. The ambient light also excites the light-storing paint 90 so that displayed numerals and characters are brightly illuminated and thus capable of being easily read. Moreover, since the light from the light-emitting paint layer 92 excites the white, light-storing paint 90 at night through the glass beads, the entire surface of the liquid crystal display is uniformly and clearly illuminated to provide a time display which is more attractive than that which was obtainable in the prior art.

Figure 12:
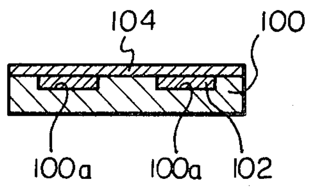
FIG. 12 is a cross-sectional view of another preferred embodiment of an illumination device according to the present invention.

FIG. 12 depicts another preferred embodiment of an illumination device in accordance with the present invention. In FIG. 12, the illumination device comprises a backing member 100 made of a synthetic resin or a metal such as titanium or aluminum and having recesses 100*a* provided with light-emitting paint 102 which is a mixture of radioactive plutonium 147 and a fluorescent paint. Reference numeral 104 indicates a lower polarizing plate of a liquid crystal display cell.

Figure 13:
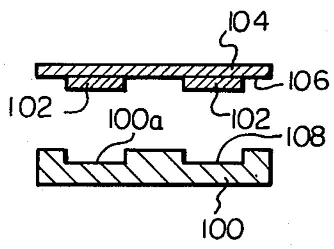
FIG. 13 is a cross-sectional view of the illumination device of FIG. 12 prior to assembly.

The fabrication of the illumination device is shown in FIG. 13, in which a translucent reflecting plate or white, light-storing paint 106 consisting of a fluorescent material is attached by a bonding or coating technique to the bottom side of the lower polarizing plate 104. The light-emitting paint 102 is then applied by printing or the like to the bottom side of the light-storing paint layer 106 only at portions which correspond to the characters or numerals which are to be illuminated. Recesses 100*a* for accommodating the light-emitting paint 102 are applied with reflecting films 108 each of which is formed by vacuum deposition or the like. The backing member 100 and lower polarizing plate 104 are then aligned and bonded together and the joint defining the interface is sealed.

Figure 14:
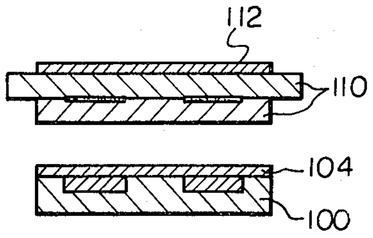
FIG. 14 is a cross-sectional view showing a liquid crystal display device of FIG. 12 and the illumination device before being combined.

The liquid crystal display device as illustrated in FIG. 14 comprises a liquid crystal display cell 110 and an upper polarizing plate 112 which are bonded together. The display device is then simply layed upon or bonded to the top of lower polarizing plate 104 which forms part of the illumination device described above.

Figure 15:
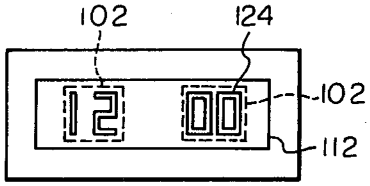
FIG. 15 is a front view of a liquid crystal display device of FIG. 14.
Figure 16:
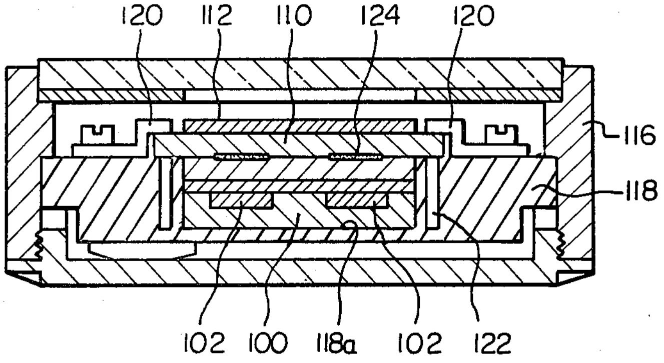
FIG. 16 is a cross-sectional view of the illumination device of FIGS. 12 to 14 as installed in a wristwatch.
Figure 17:
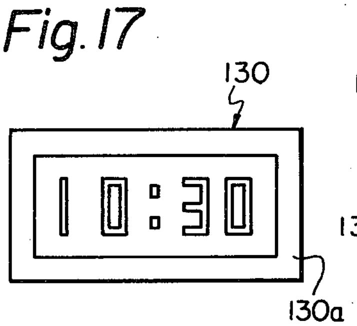
FIG. 17 is a front view of another preferred embodiment of an illumination device according to the present invention.
Figure 18:
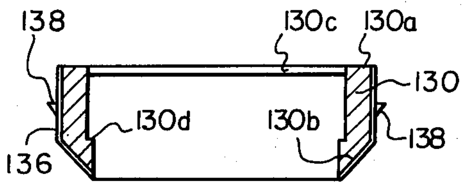
FIG. 18 is a longitudinal cross-sectional view of a light condensing member which is one part of the illumination device of FIG. 17.

FIGS. 15 and 16 illustrate an example in which the foregoing liquid crystal display device and illumination device are utilized in a timepiece having a liquid crystal display. A watch case 116 houses a module 118 which accommodates an oscillator section, circuitry, a battery and other such elements. The illumination device is fitted into a recessed portion 118*a* of the module 118 and is secured thereto by restraining frames 120 which presses down the liquid crystal cell. Electric signals from module 118 are transmitted to the liquid crystal display device by electrically conductive rubber 122.

The illumination device is in direct contact with the bottom side of the liquid crystal display device and constantly illuminates the time information displayed by liquid crystal display segments 124. During the daytime ambient light is reflected by the translucent reflecting plate or white, light-storing paing 106 disposed on the bottom side of lower polarizing plate 104 and also serves to excite the light-storing paint, thereby allowing the time information to be displayed in a bright, clear manner. Since the light-emitting paint 102 and backing member 100 are different in color, it would be possible to distinguish between them if they were left uncovered and viewed from above. As this is not a desirable condition, the paint and the backing member are thinly covered by the translucent reflecting plate or white, light-storing paint 106 so that the difference in color is not conspicuous. At night the light from the light-emitting paint 102 passes through the stacked display arrangement to illuminate the display segments. As the light-emitting paint is disposed directly below the display segments 124 as shown in FIG. 16, it is possible to obtain sufficient illumination with an extremely small amount of paint.

In illumination device of FIGS. 12 to 16, the light-emitting paint is in direct contact with the lower polarizing plate of the liquid crystal display device so that the illuminating light is not attenuated. This makes numerals and characters easy to read since they are brightly illuminated. Furthermore the structure is simple and capable of being assembled in a short period of time since the component parts are few in number and are merely stacked and joined. A thinner construction is obtainable since the lower polarizing plate also serves as a cover for the light-emitting paint.

Figure 20:
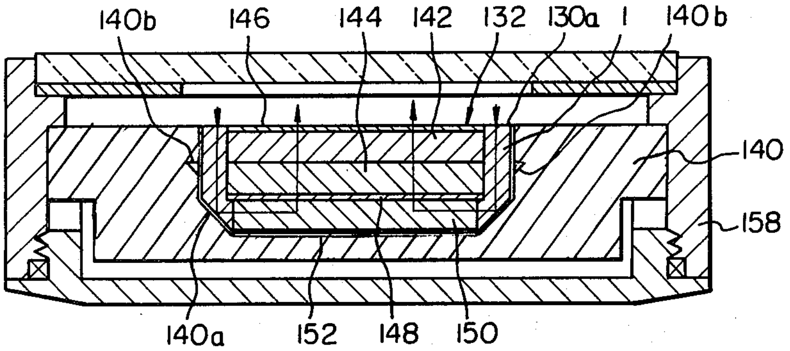
FIG. 20 is a cross-sectional view showing the illumination device of FIGS. 17 to 19 as installed in a wristwatch.
Figure 19:
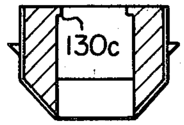
FIG. 19 is a transverse cross-sectional view of the device of FIG. 17.
Figure 21:
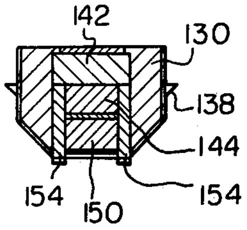
FIG. 21 is a transverse cross-sectional view showing the illumination device of FIG. 17 and a liquid crystal display device of FIG. 20 in combined form.

FIGS. 17, 18, 19 and 21 show another preferred embodiment of an illumination device according to the present invention. The illumination device comprises a light condensing member 130 composed of a transparent resin molded in a rectangular frame for accommodating a liquid crystal display device 132 as shown in FIG. 20. The top surface of the light condensing member 130 has a light admitting window 130*a* while a light reflecting portion 130*b* inwardly inclined at an angle of 45 degrees is provided at the lower portion of the light condensing member 130. A reflective film 136 is formed on the outside wall of the condensing member 130 by a technique such as vacuum deposition and the wall is provided with projections 138 that engage with wristwatch module 140. The inner side of the light condensing member 130 is formed to include projections 130*c* and stepped portions 130*d* which support the liquid crystal display device 132.

Liquid crystal display device 132 is composed of glass substrates 142, 144 interposed between upper and lower polarizing plates 146, 148 and is supported by the projections 130*c* and stepped portions 130*d*. Fixed to the bottom side of the display device is an illumination portion which comprises a light-guiding plate 150 made of a transparent resin and a reflecting plate 152 fixed to the bottom side of the light-guiding plate. Liquid crystal display device 132 is thus an entirely integrated body which is provided with the light-guiding plate positioned at the side of reflecting portion 130*b*. Disposed on both sides of the display device are longitudinally extending strips of electrically conductive rubber 154 adapted to transmit electric signals to the liquid crystal device, the lower edges of the strips extending slightly beyond the other components.

FIG. 20 shows the abovementioned illumination device installed in a timepiece. The liquid crystal display device is pressed into a recess 140*a* formed in module 140 and compresses the resilient strips of electrically conductive rubber 154. The display device is thus secured by the compresses rubber and by the engagement of the projections 138 with grooves 140*b* provided in the module 140. In the drawings reference numeral 158 denotes the watch case.

In accordance with the foregoing structure, ambient light enters light condensing member 130 from light admitting window 130*a* and is introduced into light-guiding plate 150 upon being reflected by reflecting portion 130*b*, thereby illuminating the liquid crystal cells from below so that characters and numerals can be clearly read. The light path is shown by the arrows in FIG. 20. A portion of the incident light is also reflected by reflecting plate 152 to accentuate the illuminating effect. In this embodiment, the use of a light-guiding plate 150 which includes the powder of a light-storing paint consisting of a fluorescent material will provide a greater degree of illumination since the fluorescent material is excited by the ambient light. This enables characters and numerals to be seen more clearly. Furthermore the inclusion of a light-emitting paint consisting of a radioactive composition such as 147 Pm, ZnS and Cu enables illumination of the display at night or in a darkened room.

Figure 22:
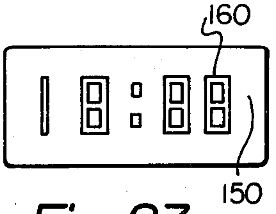
FIG. 22 is a front view of a modification of the device shown in FIG. 17.
Figure 24:
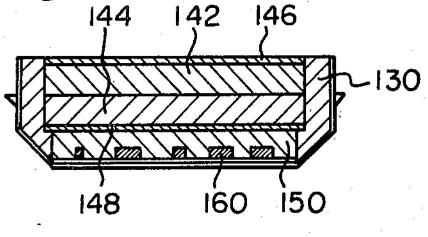
FIG. 24 is a transverse cross-sectional view showing the illumination device of FIGS. 22 and 23 and a liquid crystal display device in combined form.
Figure 23:
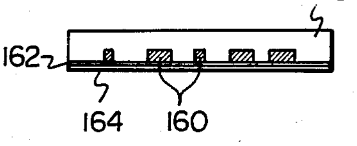
FIG. 23 is a side view of the illumination portion of the device shown in FIG. 22.

FIGS. 22 through 24 illustrate a modification of the device shown in FIGS. 17 to 21. In this modification, light-emitting paint regions 160 are embedded in the light-guiding plate 150 below all the numerals which are displayed by the liquid crystal cell. The paint is shaped into a 18.88 pattern in coincidence with the numeral positions of the display. Formed on the bottom side of light-guiding plate 150 are a light-storing paint layer 162 and a light reflecting film 164, respectively. The various interfaces are then sealed, giving an illumination portion having mirror surfaces on its top and sides. The illumination portion is then fixed to the bottom side of liquid crystal display device 132 as in the foregoing embodiment.

In the illumination device of FIGS. 22 to 24, light which has entered window 130*a* and been reflected by reflecting portion 130*b* excites light-storing layer 162 and light-emitting paint 160 and illuminates the displayed numerals upon being reflected by reflecting film 164, thus facilitating the reading of the displayed information. It is also possible to read the display in the dark owing to the light-emitting paint. As only a small amount of the light-emitting paint is applied below the display numerals in such a manner as to illuminate the numerals only, even stringent safety standards can be met because very little radioactive material need be used. Since only the display numerals can be illuminated and the area surrounding the numerals darkened, it is possible to obtain a display which can be read even more clearly.

FIG. 25 through 27 show another preferred embodiment of an illumination device according to the present invention. In this embodiment, the illumination device comprises a light condensing member 180 composed of a transparent resin molded in a rectangular frame. The light condensing member 180 is either formed integral with a watchglass 182 of a watch case 184 if the watchglass consists of a transparent resin, or is bonded to the watchglass if the latter is composed of a material other than resin. The upper portion of the light condensing member 180 has the form of a light admitting window 180*a* while a light reflecting portion 180*b* inwardly inclined at an angle of 45 degrees is provided at the lower portion of the light condensing member 180. A reflective film 186 is formed on the outside wall of the condensing member 180 by a technique such as vacuum deposition. Disposed on the bottom side of watchglass 182 by bonding or by a printing technique is a partition plate 188 for screening a module 190 which will be described later.

A liquid crystal display device 192 which is fitted within light condensing member 180 is composed of transparent substrates 194, 196 interposed between upper and lower polarizing plates 198, 200, and has an illumination portion bonded to or pressed against its bottom surface. The illumination portion comprises a light-guiding plate 202 made of a transparent resin and a fluorescent paint layer 204 consisting of a fluorescent material provided on the bottom side of the light-guiding plate 202. A plurality of light-emitting paint regions 206 are embedded in the light-guiding plate 202 below all the numerals which are displayed by the liquid crystal cells, the paint being shaped into a 18.88 pattern in coincidence with the numeral positions of the display. The paint consists of a radioactive composition of 147Pm, ZnS and Cu and possesses a light-emitting property which provides illumination in the dark.

The liquid crystal display device and illumination portion are fitted within the light condensing member 180 which has a backing plate 208 fitted into the lower end thereof. The outer periphery of the backing plate is resiliently inserted into a groove 180*c* formed in the lower portion of the condensing member 180, whereby each component of the display device and illumination portion is mutually retained and supported. These components can be replaced by removing the backing plate. The arrangement is such that, when installing these components in the light condensing member 180, reflecting portion 180*b* is positioned at the side of light-guiding plate 202.

The display device assembled in this manner is fitted in a recess 190*a* formed in module 190, and watchglass 182 is press fitted into case 184 through the intermediary of a packing 210.

In accordance with the foregoing structure, ambient light enters light condensing member 180 from light admitting window 180*a* and is introduced into light-guiding plate 202 upon being reflected by reflecting portion 180*b*, thereby illuminating the liquid crystal cells from below so that characters and numerals can be clearly read. The light path is shown by the arrows in FIG. 25. A portion of the incident light excites light-storing paint layer 204 and light-emitting paint layer 206 that produce light which makes possible a brighter degree of illumination. In the present embodiment it is possible to make use of a light-guiding plate 202 which includes the powder of a light-storing paint in order to provide a greater degree of illumination. Furthermore, embedding light-emitting paint 206 below the display numerals provides illumination even at night or in a darkened room. Moreover, module 190 cannot be seen from the outside since partition plate 188 screens the exposed upper surface of the module.

From the foregoing it is seen that the device of FIGS. 25 to 27 illuminates the liquid crystal cell from below by allowing ambient light to pass through a window and enter a light condensing portion where the light is reflected by a reflecting portion. There is thus less attenuation of light. In particular, the fact that the light condensing portion is in direct contact with the watchglass of the watch case enhances the light condensing effect so that a brighter degree of illumination can be attained. Moreover, the liquid crystal display device and illumination portion can be taken out of the light condensing portion which is formed integral with the watchglass, thus making it possible to replace only the watchglass should the latter break or crack.

What is claimed is:

1. An electronic watch construction comprising:
a casing;
a watch glass supported by said casing;
a module fixedly held in said casing and having a recess facing said watch glass;
a liquid crystal display cell at least a portion of which is disposed in the recess of said module, said display cell being fixedly mounted on one side of said module; and
an illumination device disposed in said recess of said module below said liquid crystal display cell to illuminate said liquid crystal display cell, said illumination device comprising side sealing members arranged in a predetermined shape to define a space therein, a back sealing member provided at a bottom portion of said space, a top sealing member provided at a top portion of said space, a layer of light-storing paint formed on a top surface of said top sealing member and having a high degree of reflectivity, and a light emitting paint disposed in said space.

2. An electronic watch construction according to claim 1, in which each of said side sealing members consists of a light-storing paint.

3. An electronic watch construction according to claim 2, in which each of said side sealing members consists of synthetic resin.

4. An electronic watch construction according to claim 1, in which said back sealing member consists of white vinyl chloride.

5. An electronic watch construction according to claim 1, in which said top sealing member consists of transparent polyester resin.

6. An electronic watch construction according to claim 1, in which said top sealing member consists of transparent ethylene trifluoride resin.

7. An electronic watch construction according to any one of preceding claims 1 to 6, in which said light emitting paint consists of a composition of 147Pm, ZnS and Cu.

8. An electronic watch construction according to claim 1, in which said back sealing member comprises a metal plate, and a layer of titanium white paint provided on top of said metal plate.

9. An electronic watch construction according to claim 4, in which said back sealing member has a box-shaped configuration which covers the bottom and side surfaces of said side sealing members.

10. An electronic watch construction according to any one of preceding claim 1 or 6, further comprising a plurality of glass beads fixed to the top surface of said top sealing member by said light-storing paint.

11. An electronic watch construction according to claim 7, further comprising a plurality of glass beads fixed to the top surface of said top sealing member by said light-storing paint.

12. An electronic watch construction comprising:
a casing;
a watch glass supported by said casing;
a module fixedly held in said casing and having a recess facing said watch glass;
a liquid crystal display cell at least a portion of which is disposed in the recess of said module, said display cell being fixedly mounted on one side of said module; and
an illumination device disposed in said recess of said module below said liquid crystal display cell to illuminate said liquid crystal display cell, and said illumination device comprising a light condensing member made of a transparent material and disposed outside said liquid crystal display cell, said light condensing member having a window portion on the top surface thereof so as to introduce ambient light through said window portion, a reflecting portion provided at the bottom portion of said light condensing member and adapted to reflect incident light toward a region located below said liquid crystal display cell, and an illumination portion provided on the bottom side of said liquid crystal display cell and adapted to illuminate said liquid crystal display cell upon receiving the light reflected by said reflecting portion.

13. An electronic watch construction according to claim 12, in which said illumination portion comprises a light-guiding plate.

14. An electronic watch construction according to claim 13, in which said illumination portion further comprises a reflecting plate fixed to a bottom surface of said light-guiding plate.

15. An electronic watch construction according to claim 13 or 14, in which said light-guiding plate has a plurality of light-emitting paint regions embedded in said light-guiding plate in a predetermined configuration.

16. An electronic watch construction according to claim 12, 13 or 14, in which said light condensing member is integral with said watch glass.

* * * * *